United States Patent Office 3,397,530
Patented Aug. 20, 1968

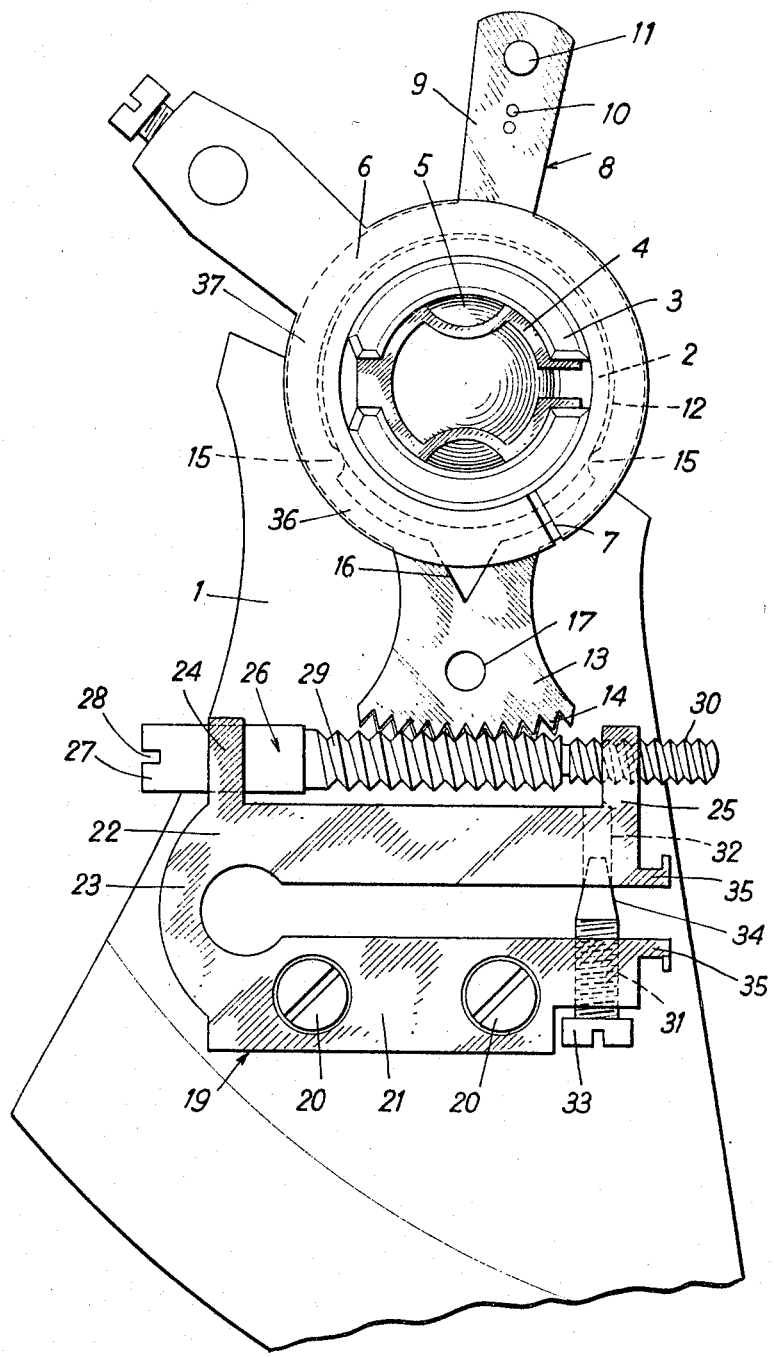

3,397,530
REGULATING DEVICE FOR A
TIME MOVEMENT
Francis Besson and Bernard Krebs, La Chaux-de-Fonds,
Switzerland, assignors to Girard-Perregaux et Cie. S.A.,
La Chaux-de-Fonds, Neuchatel, Switzerland
Filed Apr. 3, 1967, Ser. No. 627,848
Claims priority, application Switzerland, Apr. 6, 1966,
5,033/66
12 Claims. (Cl. 58—112)

ABSTRACT OF THE DISCLOSURE

An improved time movement regulating device which permits easy actuation of same to compensate for fast and slow running of the movement in increments in the order of one second per day, by means of an adjustment member in the nature of a worm wheel which has two threaded portions, one of which engages the regulator and pivots same relative to the balance cock, and the other of which causes the adjustment member to move axially as it rotates, whereby the degree of rotation of the regulator is determined by the cumulative effect of the rotation and axial displacement of said adjustment member. The regulator is formed as an elastically deformable member whereby it continuously exerts a force against the adjustment member and serves to thereby lock it against axial play as well as against inadvertent rotation thereof.

---

The present invention relates to an improved regulating device for a time movement whereby minute adjustments as to fast or slow running can be made more easily and precisely than has heretofore been possible with known regulating means.

As is well known, time movements have a tendency to either gain or lose time over a period of operation and in order to adjust the movement so as to keep accurate time a regulating device is included as part of the movement. Known regulating devices are in two parts movable relative to each other by means of a screw having two threaded portions of slightly different pitch relative to each other. A disadvantage of the known devices, however, is that they only permit adjustments in increments of about thirty seconds for each day of operation. This situation exists because the fineness of an adjustment is of course dependent upon the minimum extent to which a person is capable of moving an actuating member and in known regulating devices the kinematic relationship of parts is such that even the smallest or finest actuation which a person is able to impart thereto results in about a thirty second adjustment of the movement.

It is an object of the present invention, therefore, to provide a regulating device such that a person may easily and comfortably perform an actuation resulting in an adjustment in the order of only a few seconds and as low as one second.

It is a further object to provide such a regulating device in a form which is simple and economical to construct and of a size whereby it is practical to incorporate same in the limited space available in modern day time pieces which are of streamline design.

Other objects are those inherent in the herein presented description of a preferred embodiment of the invention, a detailed description thereof following which is referred to in the attached drawing wherein:

The sole figure is a plan view of a preferred embodiment of the invention.

With reference to the drawing, balance cock 1 in the form of a plate includes an annular boss 2 protruding from its face at one end thereof. A shock absorbing type bearing 3 it fitted within boss 2 and includes a spring 4 which is fitted within bearing 3 and which holds a cap jewel 5 therein in a manner whereby said jewel may be displaced under the action of jarring forces.

A conventional movable stud holder 6 is mounted around the outer surface of bearing 3 by means of a sleeve portion which is elastically expansible by virtue of its circumferential continuity being interrupted by a radial slot 7. Said sleeve portion lightly frictionally grips the outer surface of bearing 3. Axially beneath the stud holder 6 there is positioned a regulator 8 pivotally mounted about the outer circumferential surface of boss 2 by means of its annular bushing 12. Regulator 8 further comprises a radially extending arm 9 from which extend the customary pins 10 and 11, and a second arm 13 extending substantially radially opposite to arm 9. The end of arm 13 has a substantial circumferential extent along which is formed a toothing 14 which is concentric relative to the rotational axis of bushing 12. The inner diameter of bushing 12 is larger than the outer diameter of boss 2 whereby the two are radially out of contact with each other excepting for two inwardly directed rounded hump portions 15 which extend from bushing 12 and bear against boss 2. It will be seen that hump portions 15 embrace between themselves about 120 degrees of the circumferential extent of bushing 12, and it will also be seen that the radial thickness of the wall portion 36 of bushing 12 between the hump portions is substantially less than the thickness of the radial thickness of the remaining wall portion 37. Further, at a point intermediate the hump portions 15, bushing 12 is interrupted by a V-shaped notch 16 whose axis substantially coincides with that of arm 13. The purpose of notch 16 as well as of the reduced width of wall portion 36 is to enhance the elastic flexibility of bushing 12. An opening 17 is provided in arm 13 and is adapted to receive a suitable tool therein, such as a tweezer, for the purpose of permitting rough adjustments of regulator 8 while the latter is free of the fine adjustment means which are hereafter to be described.

The fine adjustment means of this invention includes a U-shaped bracket 19 having spaced apart arms 21 and 22, said bracket being fixedly attached to the plate portion of balance cock 1 by means of screws 20. The two arms 21 and 22 are interconnected at one end thereof by means of a relatively thin curved web 23 which permits elastic flexing of the two arms. A pair of longitudinally spaced lugs 24 and 25 extend from arm 22, lug 24 including a smooth cylindrical bore and lug 25 including a threaded bore of smaller diameter than and coaxial with the first bore.

A screw member 26 includes a smooth elongated cylindrical head portion 27 which is guidingly received within and freely rotatable in the bore of lug 24, a first threaded portion 29 which is engageable with the threaded portion 14 on arm 13, and a second threaded portion 30 which is threadedly engaged in the threaded bore of lug 25. A screwdriver slot 28 is provided in the end of head portion 27. The pitch of threaded portion 29 either is the same as that of threaded portion 14 or may be a multiple thereof. Threaded end portion 30 is of smaller diameter than portion 29 to facilitate manufacture of the piece 26, and the direction of the threads on the two portions 29 and 30 is the same although the pitch is very sligtly different.

The longitudinal or rotational axis of member 26 is slightly elevated in a direction perpendicular to the plane of the drawing figure and the teeth of toothing 14 are obliquely cut at an angle of about 45 degrees whereby the meshing of threaded portion 29 with toothing 14 results in an axial component urging arm 13 in a direction towards the plate of cock 1.

In the free end of leg 21 of bracket 19 there is provided a threaded bore 31 which extends perpendicularly to the rotational axis of screw member 26. A smooth bore 32 is provided in the corresponding end of arm 22 coaxially with bore 31. A set screw 33 is threadedly received in tapped bore 31 and includes a frustoconical end portion 34 which extends into bore 32, with the sides thereof abutting against the edge of said bore. It is seen, therefore, that set screw 33 determines the extent to which arm 22 can be flexed in a direction towards arm 21 and thereby serves to maintain threaded portion 29 pressed radially into engagement with teeth 14, the resultant of this action being that threaded portion 30 is urged radially in the opposite direction in its engagement with the teeth in the threaded portion of lug 25. In other words, with reference to the drawing figure, teeth 14 press in a downward direction against portion 29 while portion 30 presses downwardly against the teeth in lug 25. This radially directed pressing of the respective interengaging toothed portions serves to restrain member 26 against any axial play thereof and also against any inadvertent rotation thereof. In effect, therefore, the arrangement of this invention is such that the regulator 8 and the screw member 26 are self-locking after they have been set in a particular position.

As to the fineness of actuation which is possible with the aforedescribed arrangement, the following example is given.

If thread 30 has a diameter of 0.5 mm. and a pitch of 0.125 mm., and if thread 29 has a diameter of 0.6 mm. and a pitch of 0.15 mm. (these values being precisely achievable with available manufacturing methods) the circumferential displacement of regulator 8 along toothing 14 will be 0.025 mm. per turn of screw member 26. Further, if the radius of toothing 14 were fifty percent greater than that of pins 10, 11 relative to the rotational axis of regulator 8, the circumferential displacement of said pins would be 0.016 mm. per turn of said screw member 26. Therefore, since a 0.004 mm. displacement of pins 10, 11 corresponds to a time adjustment in the movement of one second per day, it is seen that a full turn of screw member 26 will adjust the movement to the extent of only four seconds per day. Obviously, a person making an adjustment on the movement would have no difficulty in being able to accurately turn screw member 26 to only 90 degrees of rotation, this providing an adjustment of only one second a day, such a fine increment being remarkable by any standards.

Since it is not possible to reduce the pitch of a thread beyond a certain point, it is clear that the combination of two threads (29, 30) having slightly different pitch, affords a much higher degree of fine calibration. In known movements having a regulator arrangement wherein the screw member includes only one threaded portion, a single turn of the screw member results in an adjustment of thirty seconds per day as compared to the four seconds per day obtainable through the present invention. The increase in fineness of adjustment is, therefore, in the order of 8 to 1, if not more.

If it is necessary to effect rough adjustments of relatively large amplitude, set screw 33 can be withdrawn and arms 21 and 22 can then be squeezed towards each other, as with a small pliers or tweezer, thereby disengaging threaded portion 29 from portion 14. A suitable tool may then be inserted into opening 17 and arm 13 moved as necessary. Subsequently, the fine adjustment can be made by means of member 26 as described herein.

The purpose of providing the elastically deformable mounting of regulator 8 about boss 2 (by means of hump portions 15, thinner walls 36, and notch 16) is to ensure that teeth 14 continuously press in a radial direction against threaded portion 29 in order to lock the member 26 against axial play or inadvertent rotational movement. If bushing 12 were a conventional cylindrical member closely fitted about boss 2, and if said bushing were not elastically deformable (as is provided for by thinner wall 36 and notch 16) the locking effect as described herein upon member 26 would be substantially nonexistent.

In analyzing the herein disclosed inventive concept, it will be noted that it is possible to turn actuation screw member 26 a relatively large amount (one full turn) while obtaining only a very small adjustment (four seconds) upon the regulator 8 because the net effect upon said regulator actually is the resultant of two opposing effects, namely: the effect of threaded portion 29 as opposed to that of threaded portion 30. Threaded portion 29 acts to pivot regulator 8 in one direction when member 26 is rotated; however, the consequent axial displacement of member 26 caused by threaded portion 30 acts to pivot regulator 8 in the opposite direction and, therefore, the net effect upon said regulator will be the difference between these two opposing rotative tendencies thereon.

While it is difficult and expensive from a production standpoint to provide a threaded portion (such as 29) with such a small pitch that said threaded portion alone could provide a minute adjustment of the regulator corresponding to a full turn of the screw member 26, it is not at all difficult to provide two threaded portions (such as 29 and 30) each having an easily obtainable larger pitch wherein the difference between the respective pitches may be extremely small.

It is essential, therefore, that the two threaded portions 29 and 30 act in opposite directions relative to regulator 8 and to different extents whereby a net effect greater than zero is obtained.

What is claimed is:

1. A time movement regulator device, comprising: a balance cock and a regulator rotatably adjustable relative to said balance cock, an adjustment means for setting the position of said regulator relative to said balance cock, said adjustment means comprising an elongate actuation screw member rotatable about an axis perpendicular to the axis of rotation of said regulator, a first threaded portion on said screw member drivingly engaged with said regulator, an axially fixed support member, a second threaded portion on said screw member threadedly engaged in said support member whereby rotation of said screw member causes same to move axially along its rotational axis and axially relative to said support member an amount determined by the pitch of said second threaded portion, and whereby rotation of said screw member drivingly displaces said regulator about its rotational axis an amount determined by the pitch of said second threaded portion and by the pitch of said first threaded portion.

2. The device of claim 1, wherein the respective pitches of said first and second threaded portions are different from each other.

3. The device of claim 1, wherein said regulator comprises a gear sector toothing along a circumferential extent thereof, said toothing being in engagement with said first threaded portion, said first threaded portion constituting a worm wheel which is axially displaceable simultaneously as it is rotated.

4. The device of claim 3, said support member being displaceable in a direction perpendicular to the rotational axis of said screw member, resilient means urging said first threaded portion and said gear sector toothing in a radial direction against each other.

5. The device of claim 4, said regulator being resiliently deformable under the action of a radial force exerted against said toothing, means acting against said support member and urging same in a radial direction towards said toothing.

6. The device of claim 5, said last mentioned means comprising a set screw member threadedly engaged in a fixed member about an axis extending perpendicular to the rotational axis of said actuation screw member, said set screw member engaging said support member and determining the radial position thereof and of said actuation screw member relative to said gear sector toothing.

7. The device of claim 5, said regulator comprising a bushing rotatably mounted about a circular boss on said balance cock, the internal diameter of said bushing being substantially larger than the external diameter of said boss whereby the respective internal and external surfaces are radially spaced apart along substantially their full circumferential extents, two spaced hump portions on the internal surface of said bushing and bearing against the external surface of said boss, said regulator bushing being thereby elastically deformable in radial directions about said boss.

8. The device of claim 7, said regulator comprising an arm extending radially from said bushing at a point substantially midway between said two hump portions, said toothing being formed along the outer circumferential extent of said arm.

9. The device of claim 8, including a notch in said arm extending outwardly from the internal surface of said bushing, the wall thickness of said bushing between said notch and the respective hump portions being thinner than the wall thickness of the remainder of said bushing.

10. The device of claim 8, the two hump portions being respectively positioned along the internal surface of said bushing at substantially sixty degrees to either side of the radial axis of said arm.

11. The device of claim 1, wherein said support member is one leg of a U-shaped bracket member, the other leg of said bracket member being fixedly attached to said balance cock, a resiliently flexible web connecting said legs at one end thereof whereby said one leg is resiliently displaceable towards and away from the other fixed leg, a set screw member mounted in the fixed leg and movable along an axis perpendicular to the rotational axis of said actuation screw member, said set screw member acting against said one leg to urge it in a direction away from said other leg and radially towards said regulator.

12. The device of claim 3, wherein the teeth of said gear sector toothing are obliquely inclined along an axis perpendicular to the plane of said regulator, and the rotational axis of said first threaded portion is elevated relative to said plane whereby the interengagement of said first threaded portion with said sector toothing results in a force urging said regulator axially towards said balance cock.

References Cited

UNITED STATES PATENTS

| | | | |
|---|---|---|---|
| 736,117 | 8/1903 | Lange | 58—112 |
| 898,962 | 8/1908 | Buckingham | 58—111 |
| 1,204,417 | 11/1916 | Doyle | 58—109 |
| 3,186,160 | 6/1965 | Dickerman | 58—112 |

FOREIGN PATENTS

| | | |
|---|---|---|
| 247,759 | 12/1947 | Switzerland. |
| 355,739 | 8/1961 | Switzerland. |

RICHARD B. WILKINSON, *Primary Examiner.*

S. A. WAL, *Assistant Examiner.*